(12) United States Patent
Chen

(10) Patent No.: US 6,918,041 B1
(45) Date of Patent: Jul. 12, 2005

(54) SYSTEM AND METHOD OF NETWORK COMMUNICATION WITH CLIENT-FORCED AUTHENTICATION

(75) Inventor: Weihai Chen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/511,025

(22) Filed: Feb. 23, 2000

(51) Int. Cl.$^7$ .............................. G06F 1/26; H04L 9/32
(52) U.S. Cl. ...................... 713/201; 713/200; 713/202; 713/151; 713/155; 713/169; 713/171; 709/203; 709/217; 709/225; 709/232; 709/310; 380/30; 380/377; 380/282; 370/230; 370/235; 370/389; 370/469
(58) Field of Search ................................ 713/201, 200, 713/202, 151, 155, 169, 171, 182; 709/203, 310, 225, 227, 228, 229, 232, 217; 380/30, 277, 282; 370/235, 230, 389, 469

(56) References Cited

U.S. PATENT DOCUMENTS

| | | | | |
|---|---|---|---|---|
| 5,481,720 A | * | 1/1996 | Loucks et al. | 713/201 |
| 5,978,478 A | * | 11/1999 | Korematsu | 713/169 |
| 6,061,790 A | * | 5/2000 | Bodnar | 713/171 |
| 6,377,691 B1 | * | 4/2002 | Swift et al. | 380/277 |
| 6,463,474 B1 | * | 10/2002 | Fuh et al. | 709/225 |
| 6,487,218 B1 | * | 11/2002 | Ludwig et al. | 370/469 |
| 6,584,505 B1 | * | 6/2003 | Howard et al. | 709/225 |
| 6,594,260 B1 | * | 7/2003 | Aviani et al. | 370/389 |
| 6,609,198 B1 | * | 8/2003 | Wood et al. | 713/155 |

OTHER PUBLICATIONS

Buchner, M. "Securing E–commerce Sites", Midrange Systems, vol. 12, No. 3, p. 28 (1), Mar. 1, 1999.
Karve, A. "Lesson 101: SSL and S–HTTP", Lan Magazine, vol. 12, No 1, p. 23, Jan. 1997.
Fielding R. et al., "Hypertest Transfer Protocol—HTTP/1.1", Standards Tracks, pp. 1–162, Jan. 1997.
Berners–Lee, et al., "Hyperttext Transfer Protocol—HTTP/1.0" Informational, pp. 1–60, May 1996.

\* cited by examiner

Primary Examiner—Ly V. Hua
(74) Attorney, Agent, or Firm—Leydig Voit & Mayer LTD

(57) ABSTRACT

A client-forced authentication mechanism for network communication enables a client to choose to "force" the establishment of an authenticated connection with a server that supports both authenticated and non-authenticated connections, while allowing the client to communicate with older servers that do not support client-forced authentication. To establish an authenticated connection with a server, the client includes authentication request data in a communication packet to the server. The authentication request data are designed such that a server supporting forced authentication would recognize them and give a predefined response, while an older server that does not recognize such data would respond with a well-defined error message according to the underlying network communication protocols. The exact format, location, and contents of the authentication request data depend on the underlying communication protocols and may be implemented in various ways. Based on the response from the server, the client is able to tell whether the server supports client-forced authentication. If so, the client sends its credentials to the server for authentication. If not, the client may determine whether to communicate with the server over a non-authenticated connection.

13 Claims, 7 Drawing Sheets

SYSTEM AND METHOD OF NETWORK COMMUNICATION WITH CLIENT-FORCED AUTHENTICATION

TECHNICAL FIELD OF THE INVENTION

This invention relates generally to network communication, and more particularly to a process of authenticating a client by a server in establishing a network connection.

BACKGROUND OF THE INVENTION

In many computer networks, client authentication is required for network security purposes. When a client attempts to access a server on a computer network, the server may require the client to be authenticated first before a connection for subsequent communication can be established. Client authentication may be implemented in various ways based on different protocols. The ability of a server to authenticate a client enables the server to effectively control and monitor the access and use of its resources by the client.

Under current network communication protocols, client authentication is typically enforced by the server that the client wants to access. If both authenticated and non-authenticated connections can be formed between the client and the server, the server will determine whether the connection should be authenticated or not. For example, the Hypertext Transfer Protocol (HTTP) has become the standard protocol for transferring HTML (hypertext markup language) data over the World-Wide Web ("WWW") on the Internet and has been implemented in many other networks for other operations. The HTTP protocol allows a server to form both anonymous (i.e., non-authenticated) and authenticated connections with different clients. Nevertheless, only the HTTP server is given the ability to enforce the authentication. In other words, a client that wants to access the HTTP server is not allowed to decide whether the connection should be anonymous or authenticated.

There are, however, many situations in which it is desirable give the client the ability to decide to form an authenticated connection. For example, the HTTP protocol has been implemented in some computer systems for a client to communicate with a printing server for remote printing. For a printing operation, the client and the printing server pass printing data and instructions by exchanging HTTP requests and responses, with the printing data and instructions included in Internet Printing Protocol ("IPP") packets contained in the HTTP requests and responses. The printer server by default forms anonymous connections with clients on the network to allow every client to use the printer. A system administrator, however, may want to form an authenticated connection with the printing server for performing operations that regular clients are not allowed to do, such as canceling queued print jobs or changing the configurations of the printing server. The existing HTTP implementations, however, do not allow the system administrator or any client to force the printing server to establish an authenticated connection.

This problem of the lack of a mechanism for a client to force the formation of an authenticated connection with a server is further complicated by the need for backward compatibility. An existing network system may have many servers and clients, and it is typically impractical to require all of the existing servers and clients to be updated together to implement any new feature. For instance, most clients and servers on the World-Wide Web ("WWW") communicate with one another under the HTTP protocol. Any proposed protocol changes to enable a client to force a server to establish an authenticated HTTP connection would be unacceptable if the client and server implementing such changes can no longer communicate with existing servers and clients under the current HTTP protocol.

SUMMARY OF THE INVENTION

In view of the foregoing, the present invention provides a way for a client on a network to "force" the establishment of an authenticated connection with a server that supports both authenticated and non-authenticated-connections, while maintaining compatibility with old servers that do not support such forced authentication. When the client determines to form an authenticated connection with a server, it includes authentication request data in a communication packet to the server to notify the server of the client's intent to establish an authenticated connection. The authentication request data are designed such that a server supporting the client-forced authentication would recognize them and give predefined responses, while an old server that does not recognize such data would respond in a well-defined way, such as sending an error message according to the underlying network communication protocols. The exact format, location, and contents of the authentication request data may be implemented in different ways and depend on the underlying communication protocols. Based on the response from the server, the client is able to tell whether the server supports client-forced authentication and preferably whether the connection is already authenticated. If the server supports client-forced authentication and the connection is not yet authenticated, the client may send its credentials to the server for authentication. On the other hand, if the server does not support client-forced authentication, the client may communicate further with the server over a non-authenticated connection.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
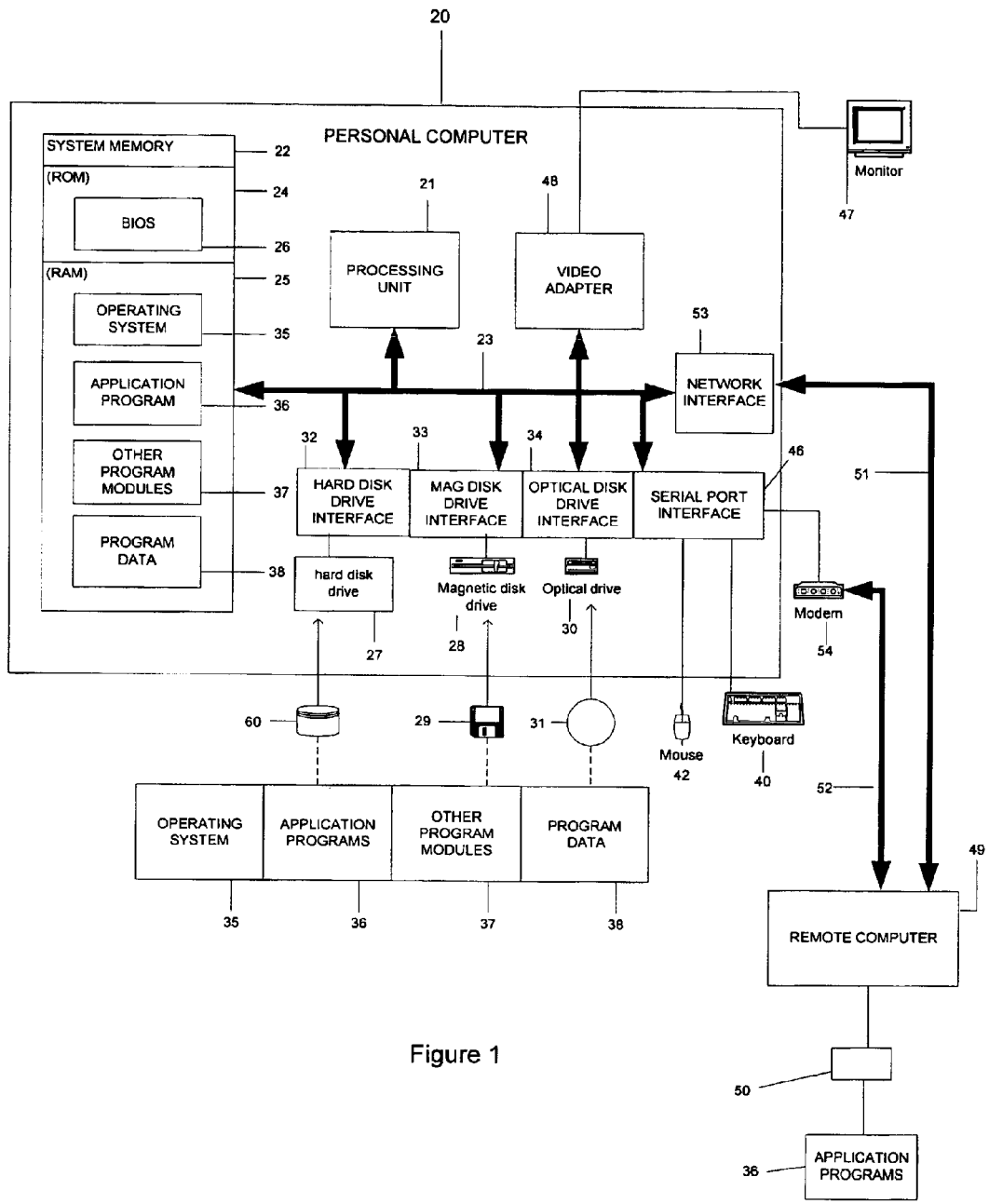
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics (e.g., printers), network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various-system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described. herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, a game port, an infrared port, a firewire port, or a universal serial bus (USB). A monitor 47 or other type of display device is also connected to the system bus 23 via an interface, such as a video adapter 48. In addition to the monitor, personal computers typically include other peripheral output devices, not shown, such as speakers and printers attached via a parallel port, a USB, a serial port, an infrared port, a firewire port, or the like.

The personal computer 20 may operate in a networked environment using logical connections to one or more remote computers, such as a remote computer 49, or other devices such as networked printers. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46, a USB, or other interfaces. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
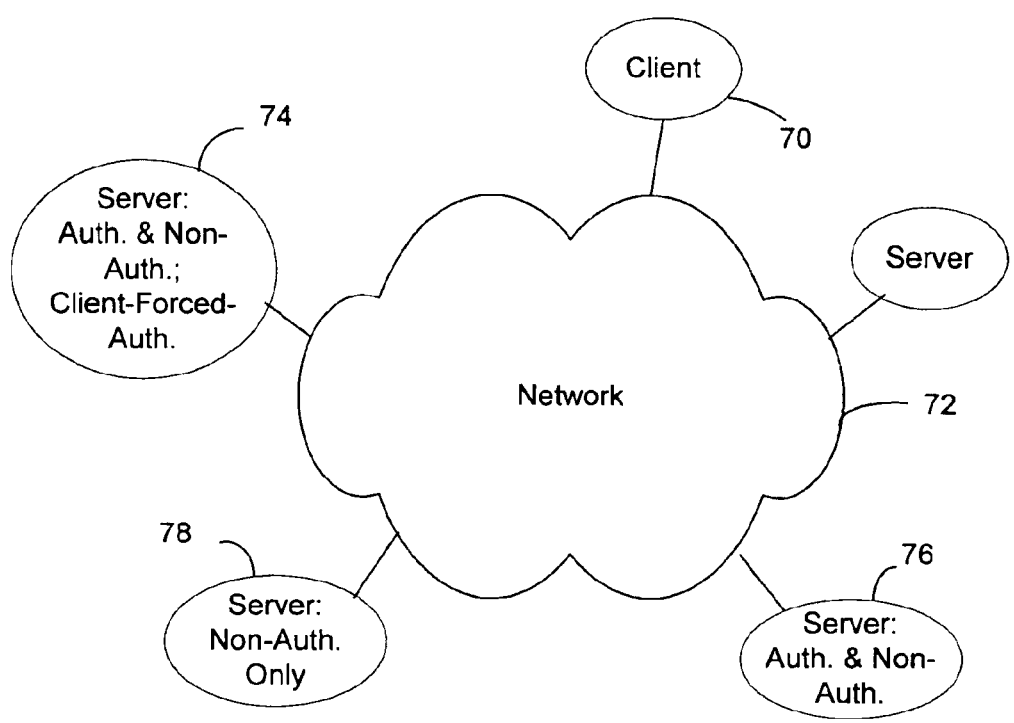
FIG. 2 is a schematic diagram showing a network with multiple clients and servers in which the invention may be implemented to enable a client to force the establishment of an authenticated connection with a server.

Referring now to FIG. 2, the present invention is directed to a way to enable a client 70 in a computer network 72 to decide whether to establish an authenticated connection with a server, while maintaining compatibility with servers that do not support "client-forced" authentication. In other words, the present invention provides a mechanism for a client, rather than a server the client wants to access, to determine to form an authenticated connection with the server and to initiate the process of forming such a connection.

As shown in FIG. 2, the network 72 may include a plurality of servers with which the client may communicate according to well-known communication protocols, such as the HTTP protocol. Some of the servers, such as the servers 74 and 76, may support both authenticated and non-authenticated connections, while some of the other servers, such as the server 78, support only non-authenticated connections. As will be described in greater detail below, some of the servers supporting both authenticated and non-authenticated connections, such as the server 74, may be new servers implemented in accordance with the invention to support client-forced authentication, while other servers such as the servers 76, 78 are older servers that do not support client-forced authentication.

The network 72 over which the client 70 communicates with the servers can have various architectures and sizes ranging from a small local area network (LAN) to a worldwide network such as the Internet. For example, in one scenario, the client may be communicating with a server over the Internet under the HTTP protocol to download HTML pages from a World-Wide Web site maintained by the server. In another scenario, the server may be a printing server residing on a LAN of the client, and HTTP requests and responses containing packets formatted according to the Internet Printing Protocol (IPP) are transmitted between the client and the server for passing printing-related data and instructions.

Figure 3A:
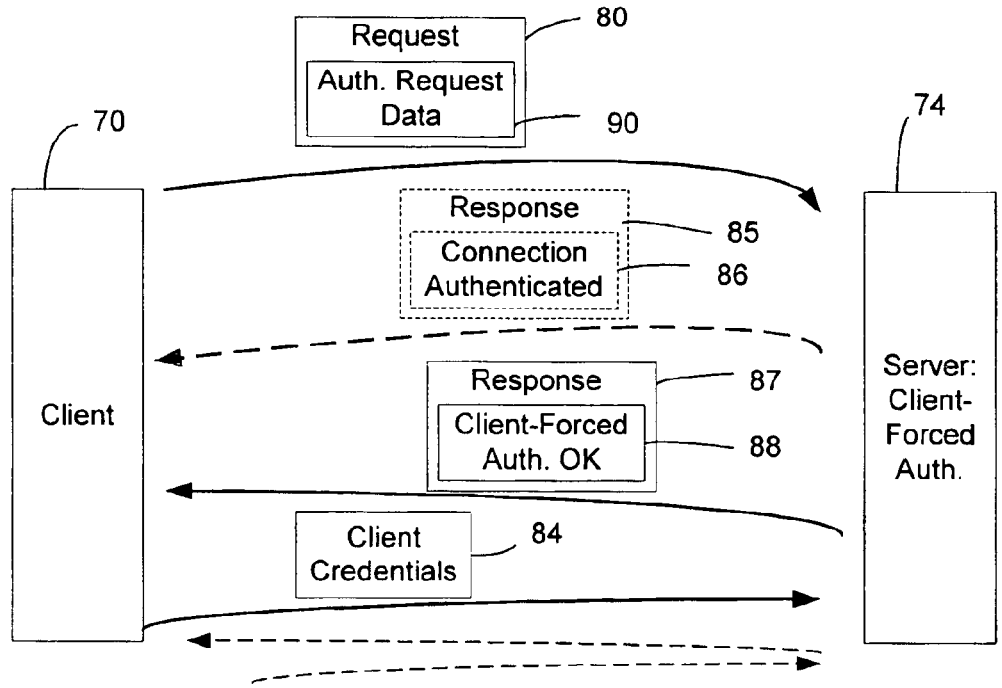
FIG. 3A is a schematic diagram showing the exchange of communication packets between a client and a server for the client to force the establishment of an authenticated connection with the server in accordance with the invention.

In accordance with an aspect of the invention, the client 70 may not know initially which servers in the network system 72 support client-forced authentication and which servers do not. Before the client 70 can establish an authenticated connection with a server, it needs to learn first whether that server is capable of supporting client-forced authentication. In accordance with the invention, this is accomplished by sending authentication request data to the server during the initial communication with the server. Turning now to FIG. 3A, when the client 70 attempts to form an authenticated connection with a server 74, it includes in its initial communication request packet 80 to the server authentication request data 90 designed for probing whether the server supports client-forced authentication. A server 74 that supports client-forced authentication would recognize such data in the initial communication packet 80 as a request from the client 70 to form an authenticated connection. After receiving the authentication request from the client, if the server 74 detects that the current connection is already authenticated, it returns a response 85 with a pre-defined message 86 to the client indicating that the connection is already authenticated, so that the client 70 does not have to be re-authenticated. If, however, the server 74 detects that the current connection is not authenticated, it returns to the client 70 a response 87 that includes a pre-defined message 88 indicating that the client may proceed with the authentication process. After receiving the response 87, the client 70 sends its credentials 84 to the server and may make other exchanges of authentication information with the server according to an authentication protocol supported by the server.

Figure 3B:
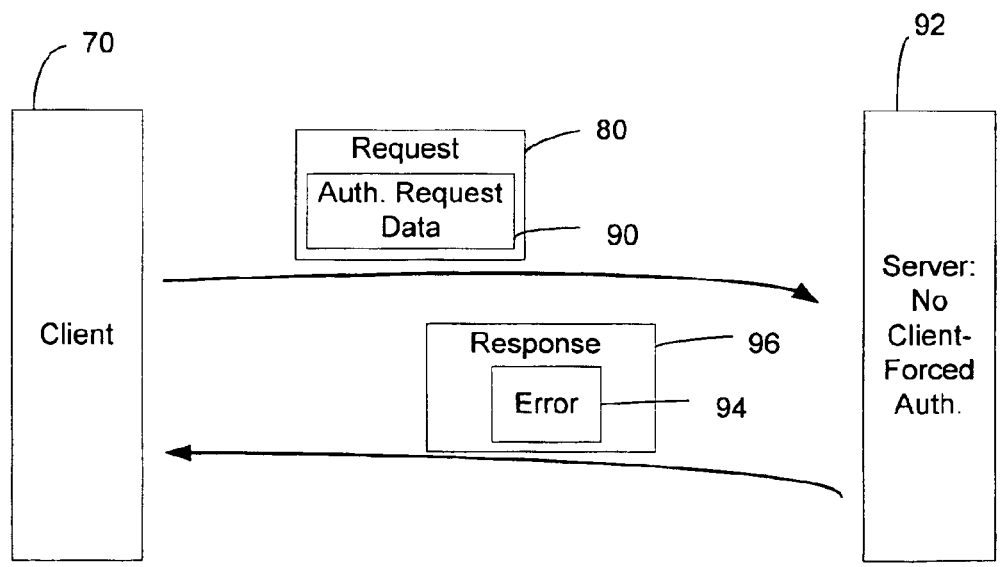
FIG. 3B is a schematic diagram showing the exchange of communication packets between a client attempting to establish an authenticated connection and a server that does not support client-forced authentication.

On the other hand, the server that the client attempts to form a connection with may not support client-forced authentication. Referring to FIG. 3B, this may be the case with a conventional server 92 that supports both authenticated and non-authenticated connections or supports only non-authenticated connections. In this case, the server 92 would not recognize the authentication request data and respond accordingly.

In accordance with a feature of the invention, the authentication request data 90 included in the initial communication packet 80 is designed such that a server that does not recognize such data would respond in a predictable way according to the underlying communication protocols. For instance, the server 92 may respond with a pre-defined error message 94. When the client 70 receives the error message 94 in the server's response 96, it knows that the server 92 does not support client-forced authentication. The client 70 can then decide whether to proceed to communicate with the server over a non-authenticated connection.

A significant advantage of the client-forced authentication mechanism in accordance with the invention is that it can be used with all servers in the network regardless of whether they support client-forced authentication. In other words, the client can send the authentication request data to a server without having to know first whether that server supports client-forced authentication. This allows a client implementing the client-forced authentication feature to be backward compatible with older servers that do not support that feature. Moreover, a server that supports the client-forced authentication is likewise backward compatible with older clients that do not have the ability to force authentication. This is because such older clients would simply communicate with the server in the conventional way according to the underlying communication protocols, i.e., they would send their credentials for authentication only when they are told by the server to do so. This backward compatibility provided by the invention is very important, because in real applications most networks would have existing clients and servers, and it would often be difficult to require all of them to be updated to support client-forced authentication.

Figure 4:
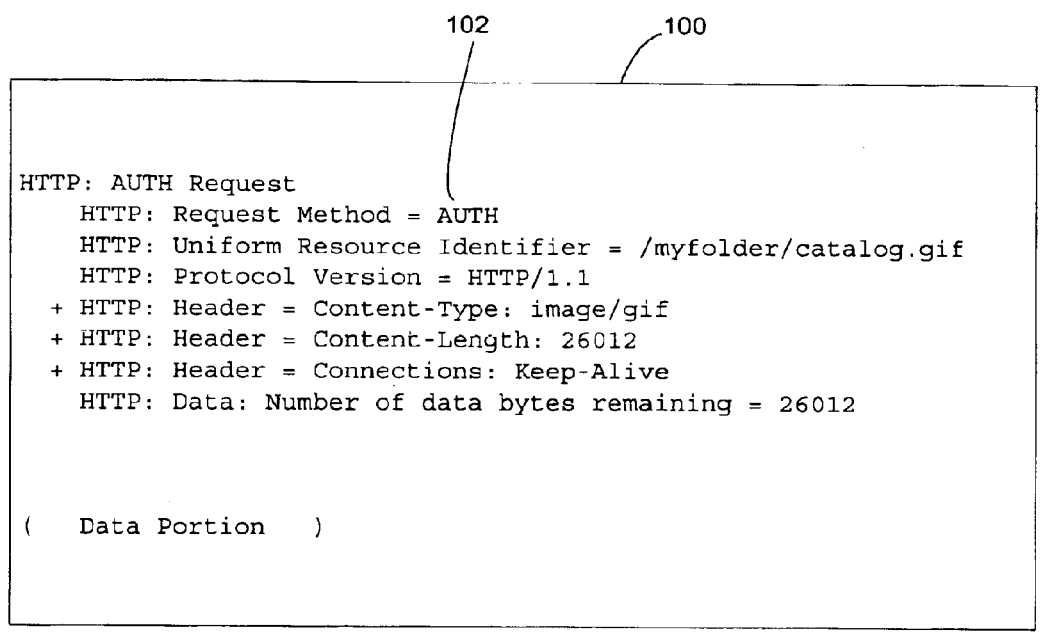
FIG. 4 is a schematic diagram showing an exemplary HTTP request sent by a client for requesting establishment of an authenticated connection with a server.

The format of the authentication request data sent by the client for forcing authentication depends on the specific implementation and the underlying communication protocols. Likewise, the response by a server to the authentication request data would depend on the design of the authentication request data and the underlying protocols. By way of example, an embodiment in which a client communicates with a server according to the HTTP protocol is described below. In this embodiment, the authentication request data is in the form of a new HTTP method named "AUTH," which is included in the header portion of an HTTP request. FIG. 4 shows an exemplary HTTP request 100 that includes a statement 102 of the method AUTH in its header portion.

Figure 5A:
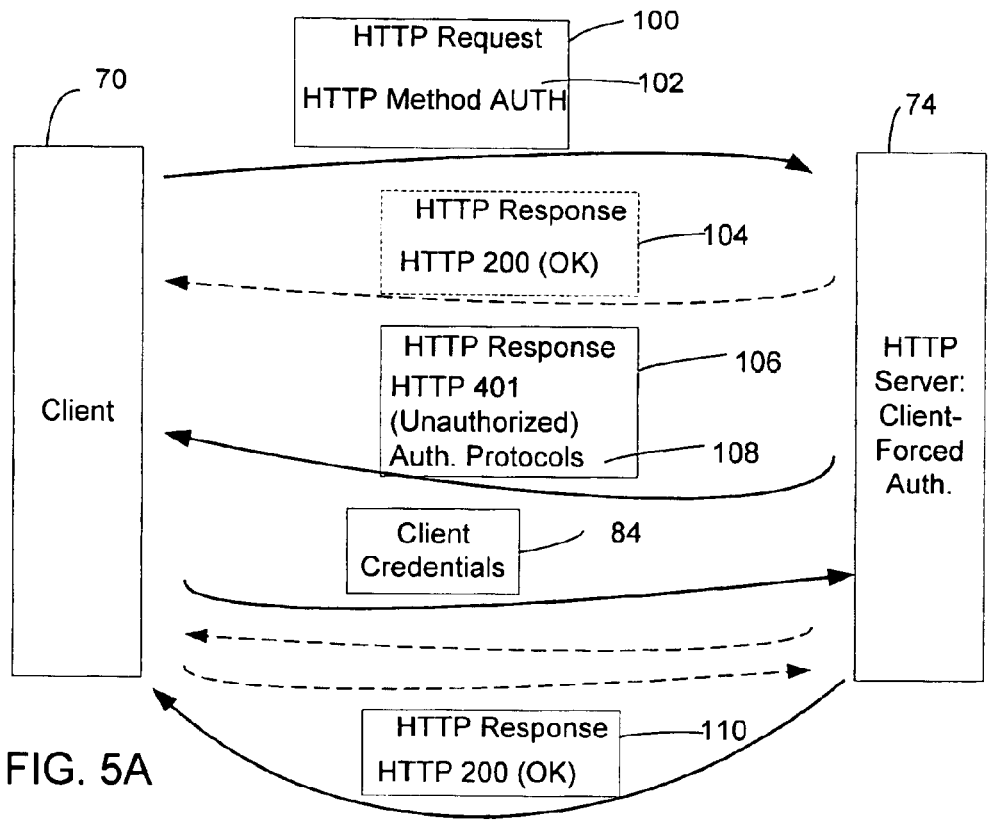
FIG. 5A is a schematic diagram showing an embodiment of the invention in which a client and a server that supports client-forced authentication communicate by exchanging HTTP requests and responses in establishing an authenticated connection.

Turning now to FIG. 5A, when the client 70 wants to establish an authenticated connection with a server 74, it sends an HTTP request 100 with the AUTH method statement 102 in the header portion of the request. In this example, the server 74 supports client-forced authentication. When the server 74 reads the HTTP request 100 from the client, it recognizes the method AUTH as a request by the client to form an authenticated connection. The server 74 then checks whether the current connection with the client 70 is already authenticated. If the server 74 finds that the connection is already authenticated, it sends a standard "Code 200 (OK)" reply 104 to the client to indicate that the connection is authenticated.

If, however, the connection is not authenticated, the server returns an HTTP response 106 indicating a "Code 401 (Unauthorized)" error defined in the HTTP protocol to indicate that the connection is not authenticated. The HTTP response 106 may also include a statement 108 that specifies the authentication protocols it supports, such as the Negotiate, NTLM, and Basic protocols.

When the client 70 receives the HTTP response 106 and sees the "Code 401" error, it knows that the server 74 supports authentication. The client then sends its credential data 84 to the server and exchange other HTTP requests and responses with the server as required for the authentication process according to an authentication protocol supported by the server. After the server 74 has successfully authenticated the client 70, it sends an HTTP response 110 with a standard HTTP "Code 200 (OK)" reply to indicate that the authenticated connection is established.

Figure 5B:
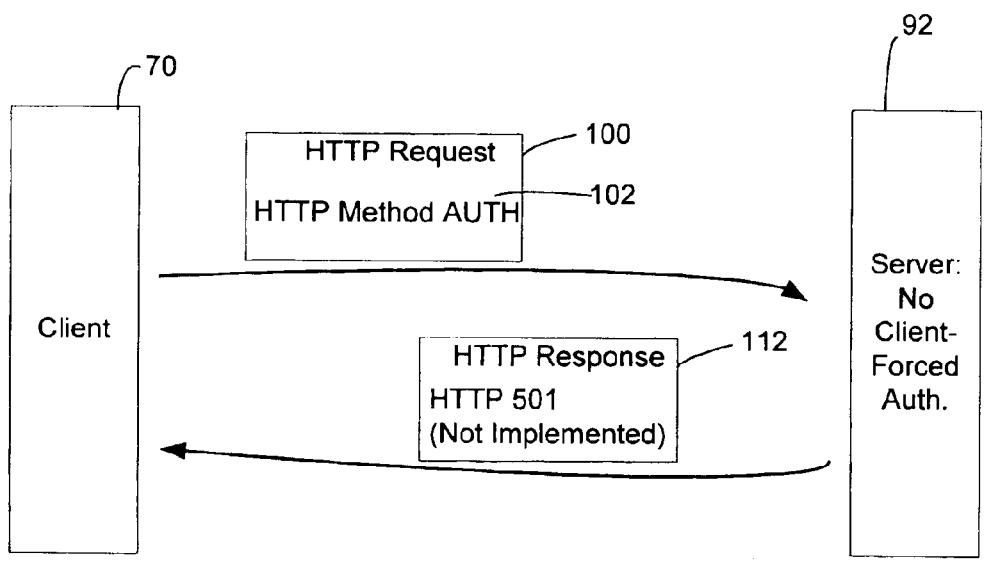
FIG. 5B is a schematic diagram showing the client of FIG. 5A communicating with a server that does not support client-forced authentication.

On the other hand, a server that does not support client-forced authentication would not recognize the "AUTH" method and would deem it as an error. As shown in FIG. 5B, when such a server 92 receives the HTTP request 100 with the authentication request data, it returns an HTTP response 112 with an HTTP "Code 501" error indicating that HTTP requests includes a method, namely the method AUTH, that is not implemented. When the client 70 reads the "Code 501" error in the response, it knows that the server 92 does not support client-forced authentication. The client 70 can then decide whether to continue to communicate with the server by sending further HTTP packets 116 over the non-authenticated connection.

In the embodiment described above, the server responses for indicating either recognition of the authentication request or failure to recognize the authentication request are handled on the same level of communication protocol, namely the HTTP protocol. It will be appreciated, however, that more than one communication protocol may be involved in responding to the client's authentication request data. This point is illustrated in the example provided in the following description. In this example, the communication between a client and a server is in the context of a system for printing operations. The server in this example may be a printing server, and the client may be a computer that sends a printing job to the-printing server. The communication in this embodiment is based on the HTTP protocol, and the exchange of data between the client and the server for the printing operation is based on the Internet Printing Protocol (IPP). An HTTP request or response transmitted between the client and the server includes in its data portion an IPP packet that contains data concerning the printing operation.

Figure 6:
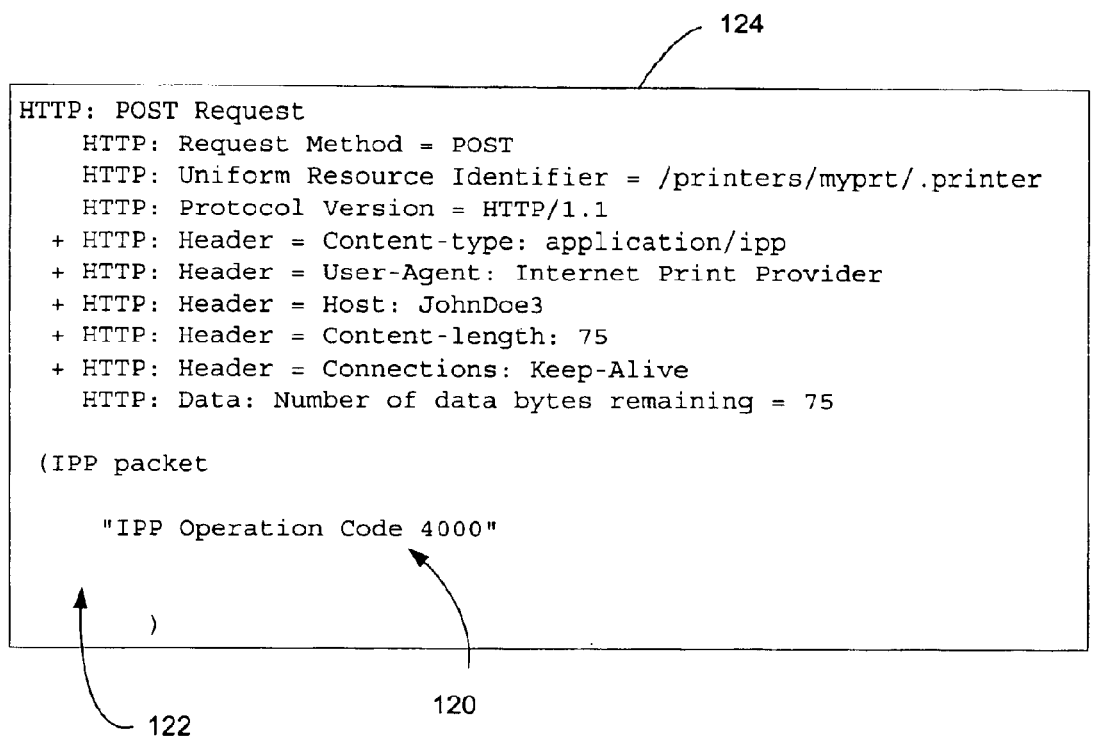
FIG. 6 is a schematic diagram showing an exemplary HTTP request for an alternative embodiment of the invention that has authentication request data in an IPP packet within the HTTP request.

In this embodiment, the authentication request data is included in the IPP packet of an HTTP request sent by the client to the server. Specifically, as shown in FIG. 6, the authentication request data is in the form of an IPP operation code 120 included in the IPP packet 122 in the HTTP request 124. This IPP operation code, which in the illustrated example is "Code 40", is an extension to the IPP protocol that is recognized by a new server supporting client-forced authentication.

Figure 7A:
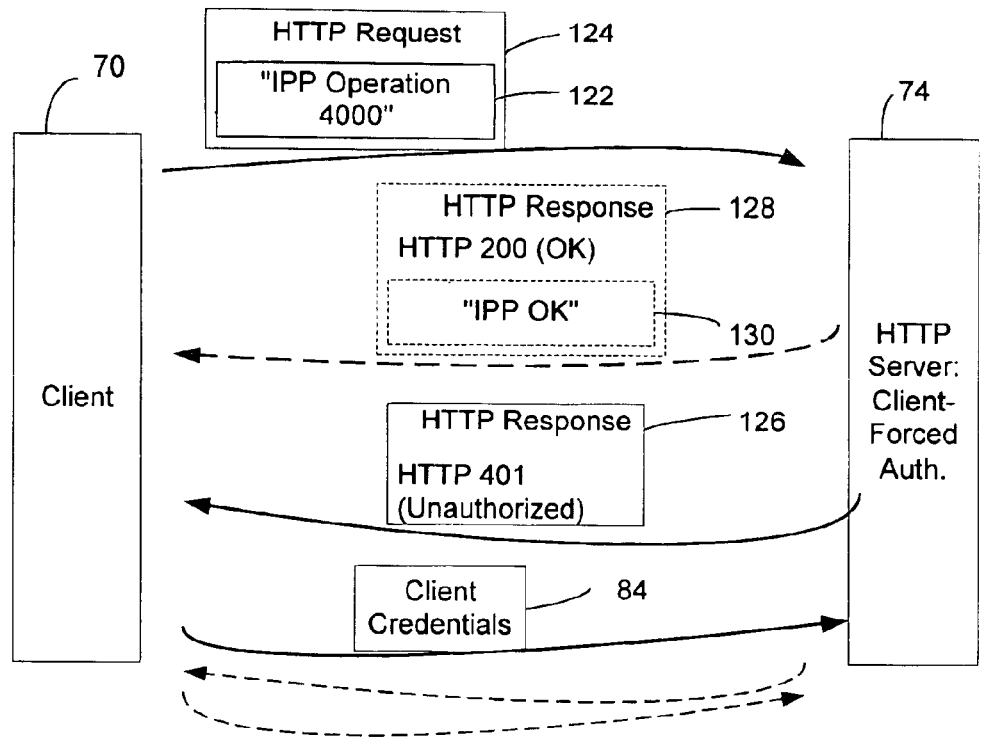
FIG. 7A is a schematic diagram showing a client and a server of the embodiment of FIG. 6 communicating for establishing an authenticated connection.

Tuning now to FIG. 7A, the HTTP request 124 is sent by the client 70 to a server 74 for establishing an authenticated connection. In this example, the server 74 supports client-forced authentication and recognizes the IPP operation code for authentication request. In response, if the connection is not already authenticated, the server 74 returns an HTTP response 126 with the HTTP "Code 401" error stated in the response, similar to the previous embodiment described above. The client can then send its credentials 84 and other information to the server for authentication. If, however, the server detects that the current connection with the client is already authenticated, it returns a response 128 that has a HTTP "200 OK" response as well as a pre-defined "IPP OK" response 130 that indicates that the connection is authenticated. Once the client 70 receives this response 128, it may proceed with other IPP requests over this authenticated connection.

Figure 7B:
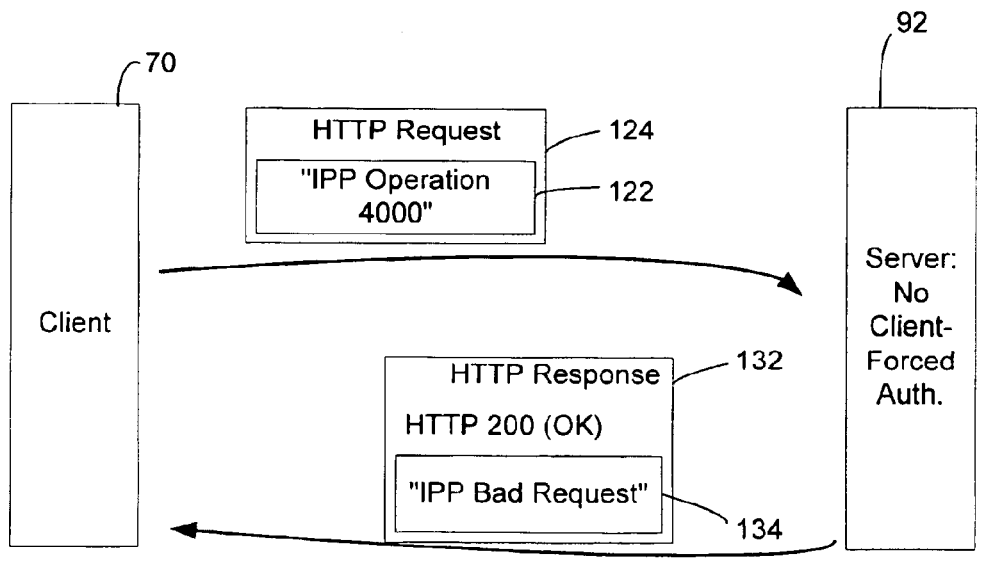
FIG. 7B is a schematic diagram showing the client of FIG. 7A communicating with a server that does not support client-forced authentication.

Turning now to FIG. 7B, a server 92 that does not recognize the IPP operation code for client-forced authentication in the HTTP request 124 provides a different response. As shown in FIG. 7B, the HTTP response 132 sent by the server 92 includes in its header portion an HTTP Status Code "200 OK", indicating that there is no problem with the HTTP connection. The IPP packet 134 in the HTTP response 132, however, includes a "bad-request" code, which is a standard IPP response to an IPP request that contains an unknown/unimplemented IPP operation, which in this example is the IPP operation code for the client authentication request. Thus, in this example, it is the IPP protocol layer rather than the HTTP protocol layer of the server that provides the error message indicating that the server does not support client-forced authentication.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps by a client for establishing an authenticated connection under the Hypertext Transfer Protocol (HTTP) with a server, comprising:

preparing a HTTP connection request packet containing authentication request data for requesting establishment of an authenticated network connection under HTTP, the authentication request data formatted for prompting a server recognizing said data to respond with a first pre-defined message and for causing a server not recognizing said data to respond with a second pre-defined message;

sending the HTTP connection request packet to the server;

receiving a HTTP response packet containing a response message from the server responding to the HTTP connection request packet;

if the HTTP response message includes the first pre-defined message, transmitting credential data of the client in subsequent HTTP packets to the server for authentication;

if the HTTP response message includes the second pre-defined message, transmitting subsequent communication to the server over a non-authenticated HTTP connection.

2. A computer-readable medium as in claim 1, having further computer-executable instructions for performing the step of: if the HTTP response message includes a third pre-defined message indicating that the client has an existing authenticated HTTP connection with the server, transmitting subsequent communication to the server over the existing authenticated HTTP connection.

3. A computer-readable medium as in claim 1, having further computer-executable instructions for performing the steps of: identifying from the HTTP response packet an authentication protocol supported by the server;

communicating with server, including said transmitting credential data, to perform authentication of the client under the authentication protocol.

4. A computer-readable medium as in claim 1, wherein the authentication request data are included in a header portion of the HTTP connection request packet.

5. A computer-readable medium as in claim 4, wherein the authentication request data identify a method defined in the Hypertext Transfer Protocol (HTTP).

6. A computer-readable medium as in claim 1, wherein each of the HTTP connection request and HTTP response packets contains a data portion containing communication data formatted according to a second communication protocol, and wherein the authentication request data are in the data portion of the HTTP connection request packet.

7. A computer-readable medium as in claim 6, wherein the second communication protocol is the Internet Printing Protocol (IPP).

8. A computer-readable medium having stored thereon a data structure having:

a first data region containing data representing a header portion of a Hypertext Transfer Protocol (HTTP) packet, including authentication request data representing a request by a client to form an authenticated HTTP connection with a server, the authentication request data formatted to cause a server not recognizing the authentication request data to respond with a pre-defined error message; and a second data region containing data representing a data portion of the HTTP packet.

9. A computer-readable medium as in claim 8, wherein the authentication data identify a method defined in the Hypertext Transfer Protocol (HTTP).

10. A computer-readable medium having stored thereon a data structure having:

a first data region containing data representing a header portion of a Hypertext Transfer Protocol (HTTP) packet, and a second data region containing data representing a data portion of the communication packet, including authentication request data representing a request by a client to form an authenticated HTTP connection with a server, the authentication request data formatted to cause a server not recognizing said authentication request data to respond with a pre-defined error message.

11. A computer-readable medium as in claim 10, wherein the data in the second data region represent communication data formatted according to the Internet Printing Protocol (IPP), and the authentication data identify an operation under the Internet Printing Protocol.

12. A method of communication for a client to force a server supporting both authenticated and non-authenticated network connections under the Hypertext Transfer Protocol (HTTP) to establish an authenticated HTTP network connection, comprising the steps of:

sending, by the client, a HTTP connection request packet to the server, the HTTP connection request packet including authentication request data indicating a request for forming an authenticated HTTP connection with the server, checking, by the server in response to receipt of the HTTP connection request packet, whether an authenticated HTTP connection with the client exists;

if an authenticated HTTP connection with the client does not exist, returning by the server to the client a HTTP response packet including a response message indicating recognition of the authentication request data;

in response to the response message in the HTTP response packet indicating recognition of the authentication request data, sending by the client credential data to the server for authentication.

13. A method as in claim 12, wherein the HTTP response packet includes an identification of an authentication protocol supported by the server, and the step of sending credential data includes communicating with the server for client authentication according to the authentication protocol.

* * * * *